US 7,783,854 B2

(12) United States Patent
Camiel

(10) Patent No.: US 7,783,854 B2
(45) Date of Patent: Aug. 24, 2010

(54) SYSTEM AND METHOD FOR EXPANDABLE NON-VOLATILE STORAGE DEVICES

(76) Inventor: Noam Camiel, 47 Bilu St. Apt 4, Tel-Aviv (IL) 64256

( * ) Notice: Subject to any disclaimer, the term of this patent is extended or adjusted under 35 U.S.C. 154(b) by 309 days.

(21) Appl. No.: 11/448,888

(22) Filed: Jun. 8, 2006

(65) Prior Publication Data
US 2007/0288717 A1    Dec. 13, 2007

(51) Int. Cl.
*G06F 12/02* (2006.01)
(52) U.S. Cl. .................. 711/170; 711/171; 711/173
(58) Field of Classification Search .............. 711/170, 711/171, 173
See application file for complete search history.

(56) References Cited
U.S. PATENT DOCUMENTS

| | | | | |
|---|---|---|---|---|
| 5,615,352 A * | 3/1997 | Jacobson et al. | ............ | 711/114 |
| 6,546,414 B1 * | 4/2003 | Dahlen et al. | ............... | 709/201 |
| 6,654,954 B1 * | 11/2003 | Hicks | .......................... | 717/162 |
| 2001/0021958 A1 * | 9/2001 | Zink et al. | .................. | 711/103 |
| 2004/0034738 A1 * | 2/2004 | Huang | ......................... | 711/115 |
| 2005/0120157 A1 * | 6/2005 | Chen et al. | ................... | 710/313 |
| 2006/0015681 A1 * | 1/2006 | Park | .......................... | 711/112 |

\* cited by examiner

*Primary Examiner*—Sanjiv Shah
*Assistant Examiner*—Jae U Yu

(57) ABSTRACT

A method and system is introduced to allow expanding the storage capacity of a storage device using other storage device units in a dynamic manner. The expanded device may emulate a single large capacity media device. Files existing on device prior to device expansion may remain valid following device expansion. Capacity of storage devices and digital appliances making use of storage devices may be expanded. Instead of replacing a device with a larger capacity device, storage capacity can be expanded. The device may allow implementing file access policies to protected files.

11 Claims, 6 Drawing Sheets

SYSTEM AND METHOD FOR EXPANDABLE NON-VOLATILE STORAGE DEVICES

CROSS-REFERENCE TO RELATED APPLICATIONS

This application claims the benefit of U.S. Provisional Patent Ser. No. 60/687,903, filed Jun. 7, 2005 by the present inventor.

This application uses the frammis vane disclosed in Provisional Patent Ser. No. 60/658,568, filed Mar. 7, 2005 by the present inventor.

FIELD OF INVENTION

This invention generally relates to devices having non-volatile storage.

More particularly this invention relates to methods enabling the expansion of non-volatile storage capacity.

BACKGROUND OF THE INVENTION

The use of non-volatile digital storage has been a rapidly growing with the advancement of the computer market. The requirement for mobile non-volatile storage has been growing with the use of computer laptops. Furthermore with the requirement for larger capacities for music players such as the iPod player by apple (www.apple.com/ipod) the requirement for digital storage is ever growing. Devices such as digital cameras and mobile phones are using non-volatile memory cards such as the flash-cards by Sandisk (www.sandisk.com) to store images and other data. Other devices of the Key-Chain Storage family by M-systems (www.m-sys.com) include USB connectivity for computers to act as a floppy disk replacement.

A unit of digital storage such as a computer hard disk, a flash card or a Key-Chain storage device and other such digital storage devices will be referred herein as a digital media storage device, or a media device.

A media device, unlike a floppy diskette includes a controller with some RAM, and or ROM or other memory. This has become necessary as these devices became more complex, managing their media transparently to the appliance, for example, in order to hide media defects and manage the media on a higher level.

A media device includes a certain constant amount of storage capacity, and is managed as a single unit by the appliance using it. For example, a computer hard disk is a single storage entity. If more storage capacity is required, another hard-disk is added. This hard-disk is then considered as a different volume and receives another drive letter in the Windows operating system, or may be mounted within the directory tree of the existing hard-disk in a Unix operating system. In this case, a hard disk is a single unit of capacity meaning files cannot be homogeneously stored on both hard drives.

A media device such as a USB key-chain storage device has got a constant amount of storage similar to a hard disk. This capacity is constant. It is formatted and it is then a single storage entity, which may be connected to a Windows or a Unix system like the case in adding a hard disk.

The term digital appliance will be referring to appliances such as a multimedia player, a camera, a mobile phone, a PC and so forth. The digital appliance may include some internal unit of storage capacity, and may include an expansion slot for adding more storage capacity. The additional storage capacity available in the case of digital appliances is similar to adding another volume in a computer. The storage available is then viewed as two different storage volumes. This limits the user by not being able to store a file larger than the maximum size of the different volumes. Furthermore, the user has to be aware of these different volumes and manage them.

A user owning a media device with storage capacity X who would like to own a single media device with storage capacity X+Y, has to purchase a new media device with storage capacity X+Y. It is not possible to expand an existing media device of capacity X with another media device of capacity Y to form a single larger capacity media.

This limitation of not being able to expand media device capacity is due to hardware and software reasons. On the hardware side, it is always easier to design a single unit that does not require expansion. On the software side, an operating system format such as FAT32, NTFS etc, is a static format in the sense that the storage capacity of the media device does not change. If the size of the capacity would somehow change, reformatting of the device is required to incorporate the new capacity size, leading to the erasing of the entire media device contents.

A user owning a media device having a certain capacity cannot expand the capacity of that device. Instead the user has to purchase a new media device in order to get a larger media device. For digital appliances such as a multimedia players or any other appliance that including non-volatile storage, the case for capacity expansion is similar to the media device problem. The device may have an expansion slot for including another storage volume, in which case an existing expansion card has to be replaced. If there is no expansion slot available, the appliance has to be replaced to increase its capacity size.

Although for key-chain USB devices it is possible to carry several media devices and use them all, this is not practical since the need for larger files is growing and having to split large files between different devices is cumbersome and not practical. Using several devices is altogether not practical and cumbersome.

It is therefore a disadvantage that media devices as well as digital appliances have to be replaced when increased capacity is desired. There is thus a widely recognized need for a media device that can be dynamically expanded to keep existing data valid through device capacity expansion, and it would be highly advantageous to have such a device devoid of the above limitations

SUMMARY OF THE INVENTION

According to one aspect of the present invention there is provided a method for dynamically changing data storage capacity of a data storage device the method comprising:
  a. connecting an additional storage unit to said data storage device;
  b. expanding total storage capacity of said data storage device using storage capacity of said connected storage unit;
  c. storing files homogeneously on said data storage device and any connected storage units.

According to a second aspect of the present invention there is provided a device capable of storing data files comprising:
  a physical non volatile memory;
  an extension connection for adding at least one storage unit to said device, said device having an extension connection interface to any connected storage units;
  an internal processor;
  an external file interface for accessing data files stored on said device and any connected storage units;

whereby data storage commands received by said device through said external file interface are translated by said internal processor and information stored in said device non-volatile memory to sectors of said device and sectors of any connected storage units through said extension connection interface to imitate a single data storage device.

According to a third aspect of the present invention there is provided a file storage device for storing files sectorially for subsequent access, the device comprising:

an external interface for accessing stored files on said device, and an internal logic for virtualizing several storage units into a single media device in a dynamic manner such that connected storage units can be changed without requiring to initialize the device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings, in which:

Figure 1A:
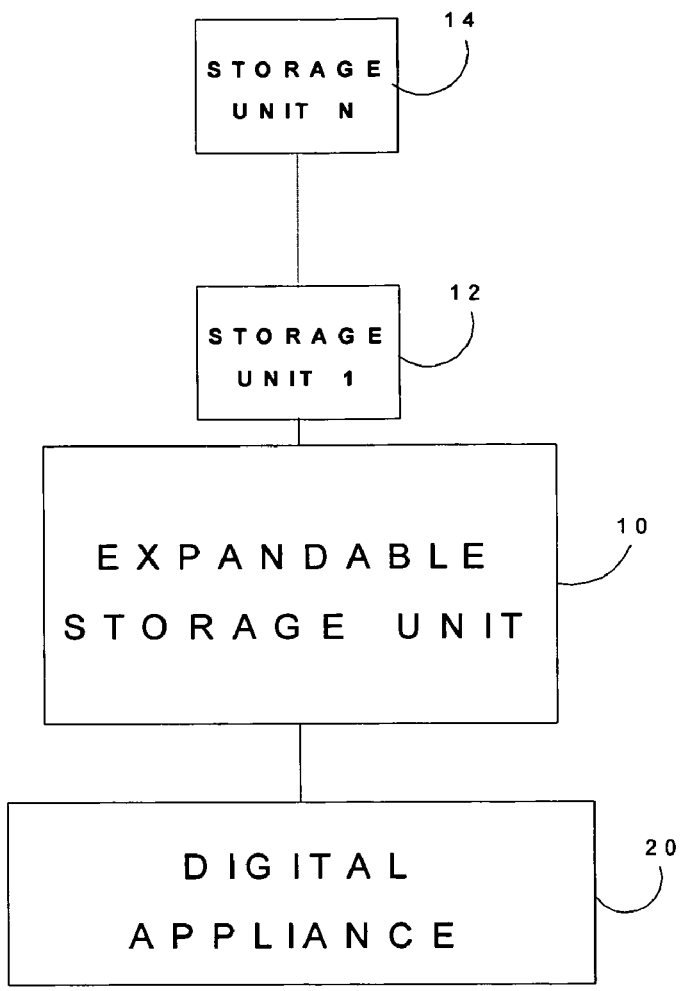
FIG. 1A is a block diagram illustration of an expandable media device with N connected storage units connected to a digital appliance, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

Several advantages of the present invention are to provide a way to expand the capacity size of a media device; to provide a way to make use of several media devices that may be combined to form a single media device with capacity of the total accumulative size of the media devices; to be able to expand the memory of digital appliances that include media devices; to provide a way to expand the capacity of a media device in a manner that may allow to keep existing data of media device valid.

In the description herein below, the term "Non-Volatile Storage" refers to storage media that remains unchanged when power is shut off. For example, Flash memory and Hard Drive magnetic media.

In the description herein below, the term "Cluster" refers to a grouping of consecutive sectors of data in a Media Device.

In the description herein below, the term "Storage Unit" refers to a single unit, which includes an amount of non-volatile memory. This unit may be in itself a media device as well as a unit for capacity expansion purposes, or this unit may only be added to another device for expansion purposes.

In the description herein below, the term "Expandable Unit" refers to a single unit, which one or more storage units may connect to, and may connect to a digital appliance.

Reference is now made to FIG. 1A, which is a block diagram illustration of an expandable media device with N connected storage units connected to a digital appliance, in accordance with an embodiment of the present invention comprising an expandable storage unit 10 having N connected storage units connected to a digital appliance 20. N storage units are connected to expandable storage unit 10. The N storage units are shown in FIG. 1 from storage unit 1 12 to storage unit N 14. Storage units may be added and removed from expandable storage unit 10. The expandable storage device 10 seems as a single device to digital appliance 20, having a total capacity of the sum or nearly the sum of connected N storage units. Storage units may be added to expandable storage unit after expandable storage device is formatted and being used so that additional storage space can be used. Storage units may be removed from expandable storage unit after expandable storage device is formatted and in use. In case of storage units removal some files may be removed. This is due to the fact that files may become broken such as miss a portion of data when a storage unit is removed. The possibility of changing the physical size of a memory device is displayed in this invention. In some embodiments the presented possibility of changing the physical size of a memory device takes place while data already on device is preserved. Data preservation occurs when storage units are added, while for removed storage units data preservation takes place for files unaffected by data stored on removed storage units.

Figure 1B:
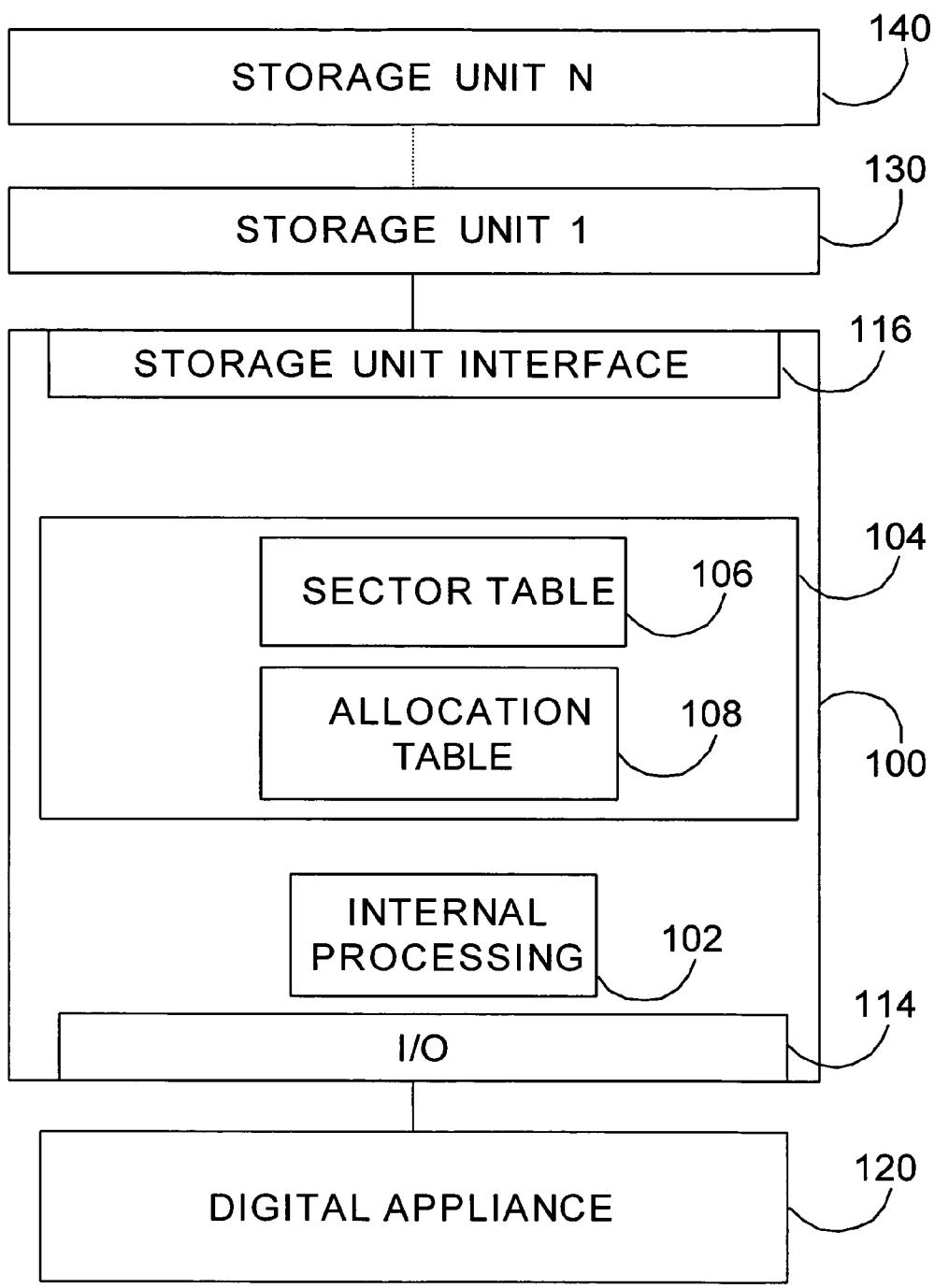
FIG. 1B is a detailed block diagram illustration of an expandable media device with N connected storage units connected to a digital appliance, in accordance with an embodiment of the present invention.

Reference is now made to FIG. 1B, which is a detailed block diagram illustration of an expandable media device with N connected storage units connected to a digital appliance, in accordance with an embodiment of the present invention comprising an expandable storage unit 100 having N connected storage units connected to a digital appliance 120. N storage units, from storage unit 1 130 through storage unit N 140, are attached to expandable storage unit 100. This fig. is similar to FIG. 1A with a detailed expandable storage unit 100. The expandable storage unit 100 includes non-volatile storage 104, an internal processing module 102 capable of data processing such as a CPU, an I/O module 114 capable of communicating with digital appliance 120 and a storage unit interface 116 capable of communicating with connected N storage units. The non-volatile storage 104 contains sector table 106 and allocation table 108. N storage units from units 1 130 to unit N 140 are attached to expandable storage unit 100. The storage units interface with the expandable unit 100 through the storage unit interface 116. The storage unit number may vary from 1 to any number N. The non-volatile storage 104 may contain other information such as conversion tables and allocation table mirrors for each storage unit. In some embodiments storage units may connect to expandable unit and be connected to one another in a serial manner.

The expandable unit 100 in this embodiment does not have any user data storage but in some embodiments may include a storage unit. The expandable unit 100 includes an allocation table 108 for the entire storage capacity of the expandable media device. For example, in a FAT32 file system the allocation table 108 contains the entire file allocation table for the expandable media device. The sector table 106 includes a table that holds location information for each sector within the expandable media device. This table may include redirection of sector indexes into allocation table 108 and N storage units. The table may assist to translate a requested sector number by digital appliance 120 received through I/O module 114 to a sector within a storage unit or allocation table. The translation table of sector table 106 may include a sector number offset for each storage unit, as well as corrections, for example, in case the number of sectors per cluster may not be uniform upon all storage units.

During operation, the digital appliance 120 views the expandable media device as a single media device having an allocation table. The allocation table resides within allocation table 108. When file operations occur by digital appliance 120, allocation table updates are converted into updates within allocation table 108. Data sector read and write operations are converted through sector table 106 to the requested sector within a storage unit in a manner that corresponds to the sector requested. It is the sector table 106 responsibility to make the correspondence between requested sector by digital appliance 120 and sector within storage unit or allocation table.

Figure 3:
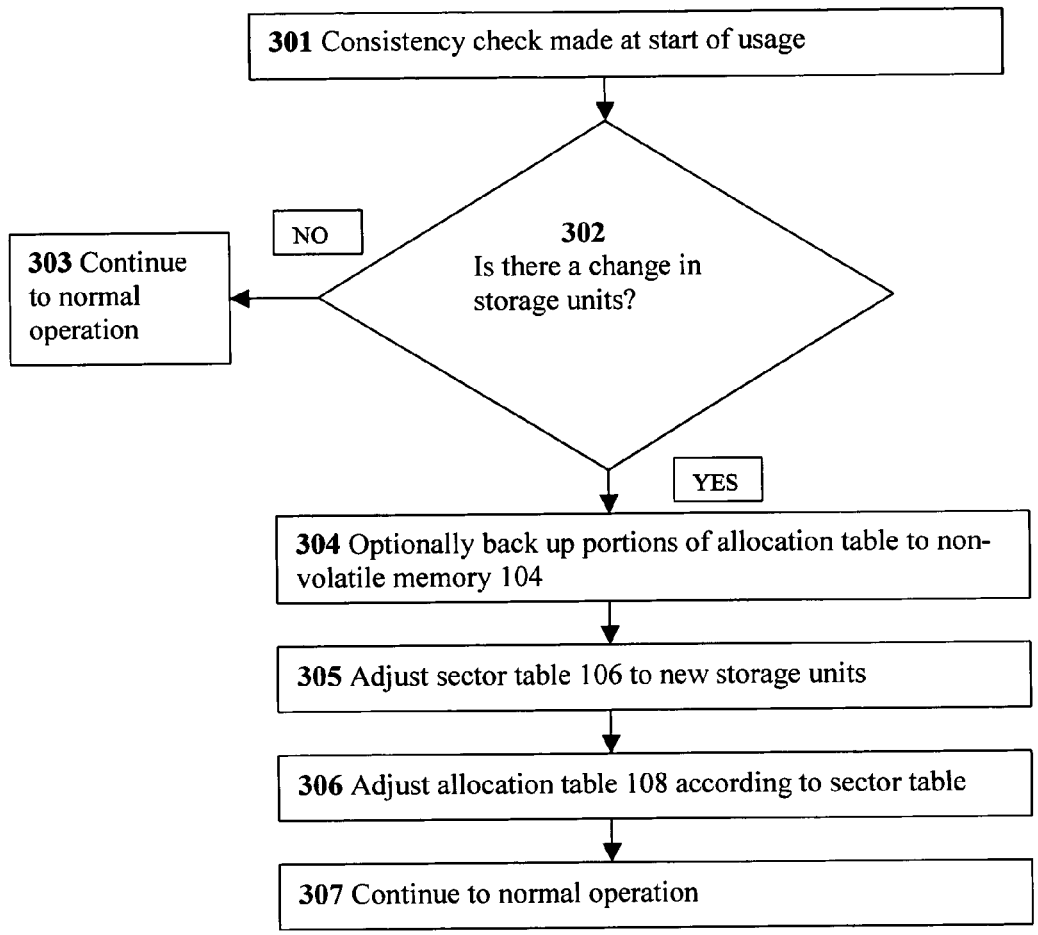
FIG. 3 is a schematic flowchart for handling a change in storage units connected to an expandable media device, in accordance with an embodiment of the present invention.

When another storage unit, N+1, is attached to an expandable media device having N storage units connected, the expandable media device detects the change through expandable unit interface 116. As a result necessary changes are made to sector table 106 and allocation table 108 in order to dynamically form a single virtual device with total storage capacity of expandable media device having N storage units with the additional storage capacity of storage unit N+1. The files on expandable media device with N storage units may remain valid following the addition of storage unit N+1. This process is illustrated in FIG. 3.

Internal processing module 102 may have access to various types of volatile and non-volatile memory such as RAM, ROM, FLASH, EPROM, Magnetic Disk media etc, not included in the drawing for clarity. Please note that other modules may be included in the expandable media device not included in the drawing for clarity.

In some embodiments each storage unit includes other modules such as a CPU as well as others.

In some embodiments the expandable device may not be separate from a digital appliance as illustrated in FIG. 1A and 1B, but may be a single unit containing non-volatile memory, such as mobile multimedia players. In some cases the number of storage units attached to expandable media device may range from 0 to a constant M.

In some embodiments each storage unit may include an allocation table, which may be kept updated by expandable storage unit 100, for example according to sector table 106 and allocation table 108. In some embodiments sector table 106 and allocation table 108 may be deduced upon initialization of expandable media device from the allocation table of each storage unit. In some embodiments having this deduction may allow an embodiment without using non-volatile memory for sector table 106 and allocation table 108. In some embodiments where each storage unit allocation table is kept updated separately, each storage unit may be added or removed from expandable media device. In this case a storage unit may be used separately or in a different form of collection of storage units, either on its own or with other storage units. In this case a single large file may be divided into separate files in each storage unit.

In some embodiments where some file access may be protected from digital appliance, such as in reference to patent application "System and Method For A Dynamic Policies Enforced File System For A Data Storage Device" filed Mar. 7, 2005 by the present inventor, protecting of file contents may be accomplished in accordance with sector table 106 and allocation table 108. In some embodiments file content protection occurs separately in each storage unit. A method for protecting a file that is split between several storage units is presented in FIGS. 4 and 5.

In some embodiments each device may also function as a storage unit. In some embodiments each device includes a connection for expansion such that devices may be stacked to expand storage capacity.

Figure 2:
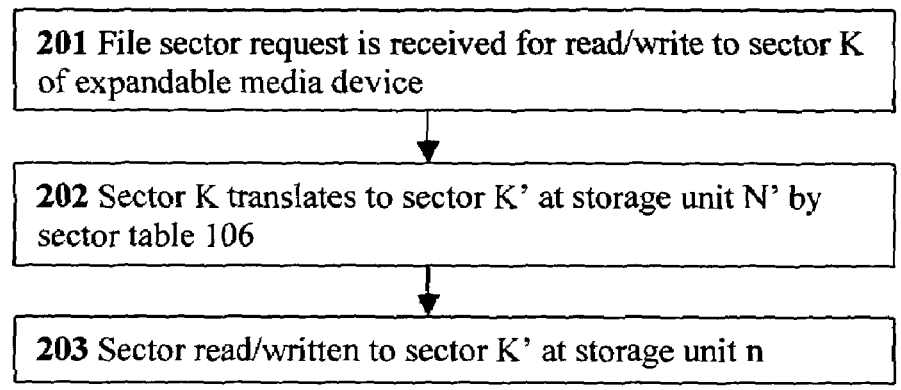
FIG. 2 is a schematic flowchart for reading and writing a sector of an expandable media device, in accordance with an embodiment of the present invention.

Reference is now made to FIG. 2, which is a schematic flowchart for reading and writing a sector of an expandable media device, in accordance with an embodiment of the present invention.

In step 201 digital appliance requests sector K of expandable media device to be read or written.

In step 202 sector K of expandable media device is translated to sector K' at storage unit N'. This translation is carried out by sector table 106 and processing unit 102. The sector table holds information regarding a correspondence between virtual sectors of virtual single expandable media device and real sectors in a storage unit or allocation table space. When a sector K is requested, the sector table information is viewed to find the actual location where the virtual sector K resides. The information in sector table 106 returns which storage unit or allocation table storage area the requested sector is located N' as well as the number of sector within that unit, K'. This translation may hide the sector segmentation of storage unit 1 130 to storage unit N 140, as well as the allocation table size, and other adjustments such as different number of clustering which may exist between the storage units. This translation hides the different sets of sectors into a single consecutive media device having a single allocation table, a single continuous data storage area with a constant number of sectors per cluster.

Different number of sectors per cluster may be implemented. For example, the expandable media device unit may be configured to have 1 sector per cluster while the actual sectors per cluster may actually be 8 in the storage unit K'. Upon a sector request the expandable unit may read the entire cluster from the relevant storage unit and return the requested sector out of the cluster.

Sector table 106 may allow keeping track of physical sectors in storage units, converting them to virtual sectors in accordance with allocation table 108.

In some embodiments continuous sectors in virtual expandable media device correspond to continuous sectors in each storage unit and allocation table space, allowing for better performance with minimum range checking.

In step 203 sector K' in storage unit N' is read or written as requested, completing the requested operation as if sector K of a single device has been read or written.

This series of steps displays how read sector and write sector operations may be carried out with the expandable media device in a manner that makes several different storage units appear as a single storage unit to digital appliance.

Reference is now made to FIG. 3, which is a schematic flowchart for handling a change in storage units connected to an expandable media device, in accordance with an embodiment of the present invention.

In step 301 a consistency check is made at start of usage, such as when an expandable media device is connected to a digital appliance. This check is made in order to identify if storage units previously connected are still in place and if storage units have been added or removed since last device usage. This check may be made with the assistance of storage unit interface 116, allocation table 108, sector table 106, and storage units 130 to 140.

In step 302 consistency check of step 301 may be analyzed, whether a change to storage units has been made. If no change has been made, step 303 follows. If a change has been detected, step 304 follows.

In step 303 the device continues to normal operation, such as illustrated in FIG. 2. This is possible since no change has been made and the expandable device is consistent.

In step 304 portion of allocation table is optionally backed up. This may be done for example in a case where a storage unit is removed and some of allocation table 108 is removed. In order to allow restoring the expandable media device at a later time by returning the removed storage unit, some of the information of the allocation table 108 may be backed to non-volatile memory 104.

In step 305 sector table 106 is adjusted according to new storage units. This adjustment may change the size of the allocation table 106 so that a smaller or larger number of sectors will be used for allocation table. Existing storage unit sector number mapping may be changed to facilitate the current size of the expandable media device. Additional storage unit sector numbers may be added for the sector table mapping to facilitate a larger size expandable media device. In some embodiments cluster numbers are used instead of sector numbers. In some embodiments a mixture of sector numbers and cluster numbers are used.

In step 306 adjustments are made to allocation table 108 according to sector table 106. For example, if storage units are added then additional storage is prepared and initialized to serve as part of the allocation table.

In step 307 the device continues to normal operation as a single media device.

In the following paragraph an exemplary embodiment of an expandable media device using a FAT32 file system is used to describe processes occurring when adding an additional storage unit to an expandable media device while preserving existing data files on expandable media device. In FAT32, files and directories are contained in clusters numbered from 2 onwards. The cluster numbering starts following the FAT32 allocation table herein referred to as FAT. Since the FAT may be held within expandable unit 100 at allocation table 108, more storage for FAT may be available within allocation table 108 than is currently in use. FAT may be enlarged to reflect the added storage of the additional storage unit, by adding entries to the FAT according to the added number of clusters in the added storage unit. Following the FAT expansion, sector table 106 is updated to route added allocation table sectors to allocation table 108 and to route cluster 2 and onwards to sector numbers incremented by the addition of sectors used in allocation table 108. Sector table 106 is then updated to route added capacity clusters to the added storage unit. In addition, some necessary value changes to FAT data within allocation table 108 of expandable unit 100 may be made to imitate a larger capacity media device, such as total number of sectors in partition, number of sectors per FAT, number of free clusters, etc. These are values located at the start of any standard FAT such as Master Boot Record and Volume ID sector. In some embodiments the added storage unit may be formatted with FAT32 format. In this case the expandable unit 100 may use the storage unit clusters while the FAT of the storage unit may remain unused. In some embodiments the FAT of the storage unit may be kept updated by expandable unit 100. As explained above, cluster numbering previous to capacity expansion remain unchanged following capacity expansion. Therefore existing files on expandable media device prior to capacity expansion may remain valid following capacity expansion. Note that in FAT32 two copies of FAT exist. When FAT size is increased both copies sizes increase.

Preserving existing files upon the removal of storage units from an expandable media device is problematic because data belonging to data files may be present on removed storage unit. In case of storage unit removal it may be possible to preserve files that none of their data portions exist on the removed storage device. It may be possible to use external software to allow moving data between storage units in order to allow emptying a storage unit for removal.

When a storage unit is removed, similar steps may be taken to the above case of adding storage units in order to preserve existing data files with no data portions on the removed storage units. The steps that may be taken are decreasing allocation table 108 size to accommodate a smaller-sized device. Sector table 106 changes absolute sector mapping so that a smaller number of sectors are used in the allocation table. Sector table 106 changes mapping to decrease removed storage unit clusters. In addition, changes to FAT may be required due to changes in cluster numbers that may be in effect if a storage unit is removed. Other changes to FAT may be required as indicated above.

Following the removal of a storage unit an application or an internal program may be carried out on the expandable media device, so that files that now may miss some or all of their data clusters may be handled. One approach for such handling may be to remove partial files. Other approaches may be to store remaining file parts on media device or transfer partial files to digital appliance 120.

In some embodiments the handling process for changing storage units occurs at time of connection of expandable media device to digital appliance 120.

In some embodiments the process of adding and removing storage units may occur at different or additional times to device connection to digital appliance. In some embodiments this process occurs at device power up.

In some embodiments it is not required to format the expandable media device when adding a storage unit. This is possible similar to the manner as explained when existing files are kept following the addition of a storage unit. The FAT area is increased within allocation table 108, sector table redirects data as required according to FAT new size and added storage size of additional storage unit. Some values are changed in the file system header to reflect additional change in size as indicated above in the case for allowing existing files to remain. Additional FAT sectors within allocation table may require to be initialized such as being set to zero. In a similar manner it is not required to format the expandable media device when removing a storage unit.

This series of steps displays how expandable media device may handle change in storage units in order to expand or decrease storage size. The change of storage units may allow to keep files on expandable media device that exist prior to change in connected storage units.

In some embodiments data files may be protected from digital appliance, such as in reference to provisional patent application "System and Method For A Dynamic Policies Enforced File System For A Data Storage Device" filed Mar. 7, 2005 by the present inventor. In such embodiments the protection of files may be accomplished for a single storage unit. A method to protect a file that is split between several storage units may be accomplished as described in FIGS. 4 and 5 as follows.

In the description herein below, the term Logical Block Addressing or "LBA" refers to a method for addressing sectors where instead of referring to a drive's cylinder, head and sector number geometry, each sector is assigned a unique sequence number. In essence, LBA is a means by which a drive is accessed by linearly addressing sector addresses. The LBA method is being used for general media devices and will be used herein to define a virtual media address of a media device.

In the description herein below, the term "Physical User Media" refers to non-volatile storage of storage unit available initially to the user.

In the description herein below, the term "Internal User File System Analyzer" refers to a method of accessing user file information by media device.

In the description herein below, the term "Internal File Table" refers to a file table information store kept within storage unit not available to digital appliance. This information may be a copy of some or all of user file table information.

In the description herein below, the term "Dynamic Security Policy Enforcer" refers to a method of protecting access to non-volatile storage LBAs, according to each LBA policy.

In the description herein below, the term "LBA DB" refers to a database allowing marking LBAs of storage unit with access policy types.

In the description herein below, the term "Decryptor/Validation" refers to unit which may decrypt or validate data, internally to storage unit. This method may be accomplished by using an internal key available internally to storage unit.

Figure 4:
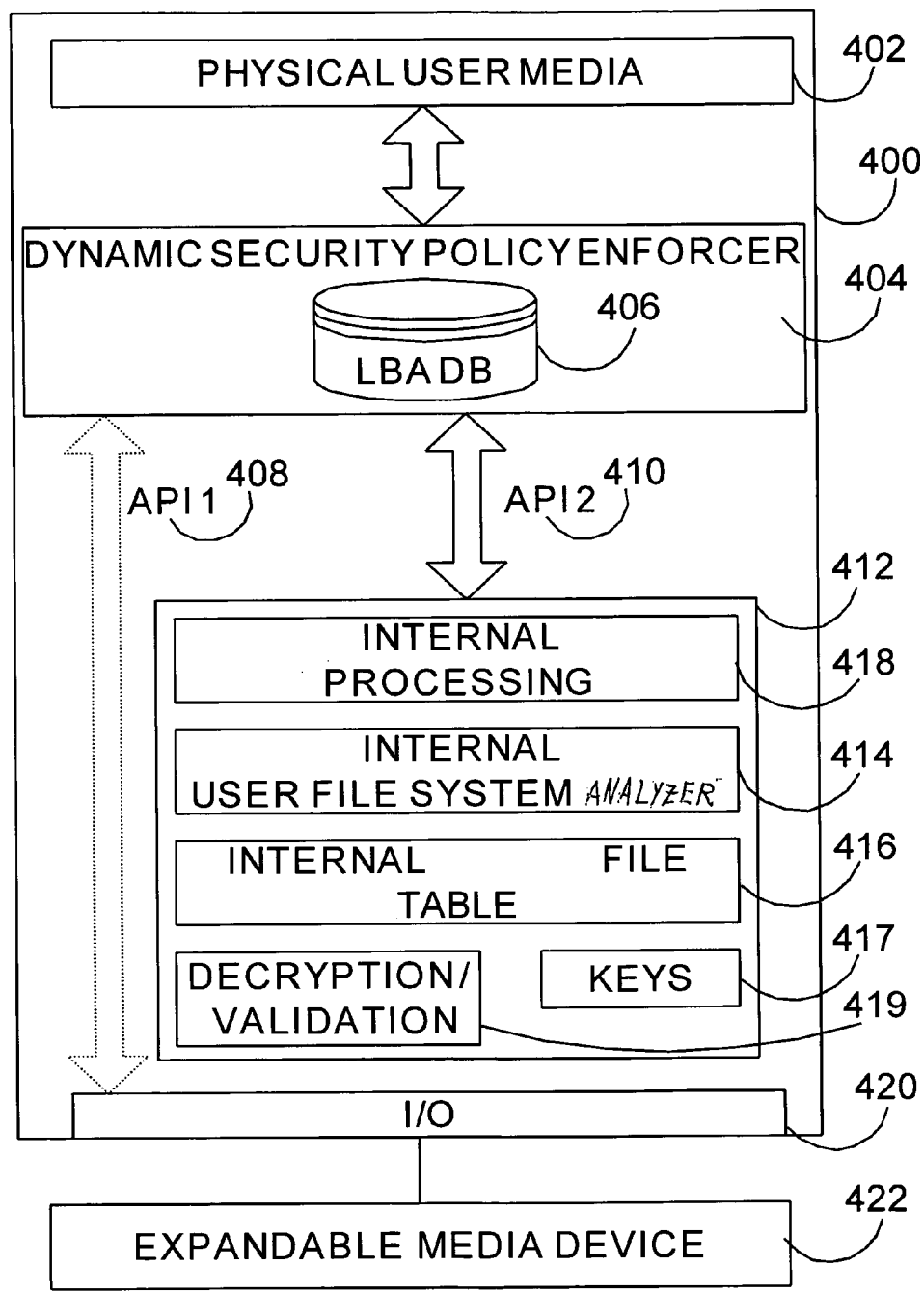
FIG. 4 is a block diagram illustration of a storage unit having a dynamic enforcement policy and an independent user file table connected to an expandable media device, in accordance with an embodiment of the present invention.

Reference is now made to FIG. 4, which is a block diagram illustration of a storage unit having a dynamic enforcement policy and an independent user file table connected to an expandable media device, in accordance with an embodiment of the present invention comprising a storage unit 400 connected to an expandable media device 422. The storage unit 400 includes physical user media 402 where user non-volatile data is stored, a dynamic security policy enforcer 404 for enforcing policy rules for accessing physical user media, which will be referred to herein as policy enforcer. The storage unit further comprises internal independent user file system table and processing unit 412, and an I/O module 420 for communication. The policy enforcer 404 supports two different sets of API calls in this embodiment, API 1 408 and API 2 410. The policy enforcer 404 includes an LBA database 406, where rules regarding access to sectors within physical user media 402 are kept. The internal independent user file system table and processing unit 412 comprises an internal processing module 418 for internal computing, internal user file system analyzer 414 for analyzing user file system in physical user media 402 independently, an internal file table 416 for storing file table information from analyzer 414, a decryption/validation module 419 and Keys 417. The user physical media 402 refers to the media that may be accessed and used by the expandable media device 422. This media may be accessed through LBA numbering. The policy enforcer 404 may manage access to the user physical media 402 in a manner, which depends upon the LBA that is being accessed, the operation requested and the API that is being used for access. The LBA database 406 may include policy entries for LBAs in the physical user media 402. For example, the LBA database may include a policy entry for each of the LBAs in the physical user media 402, specifying the policy for each LBA such as which of the LBAs are accessible from outside the storage unit. In another example, only policy entries that are different to a default policy are kept. The dynamic property of the policy enforcer 404 is accomplished by allowing dynamic changes within the LBA database for each LBA in the physical user media 402, pending an appropriate API request. The fact that the policy enforcer 404 is internal to the storage unit 400 and inaccessible by the expandable media device 422 is a preventive measure against inappropriate access. In this implementation, two different policies are used. In other implementations more types may be used. The invention is not so limited. The internal independent user file system table 412 may contain information about the files parts contained in the physical user media, such as the order and location of sectors or clusters making up a file. In case the storage unit file allocation table is active and relevant, this information may be gathered by the internal user file system analyzer 414, which mounts the user's file table and extract user file information. In case file table of expandable media device is used, information may be accessed through I/O module 420 from expandable media device 422. This information may then be copied to internal file table 416. Other manners of accessing user file table exist, such as by digital appliance 120 connected to expandable media device. In some embodiments the digital appliance 120 may extract user file table information and pass the information to the expandable media device in parts, which may be kept in volatile memory and/or in non-volatile memory. The internal independent user file system table 412 has access to each LBA of the physical user media 402 through non-limiting API 2 while the expandable media device and digital appliance 120 have access to each LBA of the physical user media 402 through limiting API 1. In this manner an internal processing unit 418 is able to access file data existing within the physical user media 402 independently, and navigate through user files with the help of the internal file table 416. This independent access allows internal processing unit 418 to make computations based on data, which is not accessible to expandable media device and to digital appliance and output the results through I/O module 420 or to physical user media 420. In this manner data is protected as required by rules in dynamic security policy enforcer 404.

Please note that to the internal processing module 418 may be accessible various types of volatile and non-volatile memory such as RAM, ROM, FLASH, EPROM, Magnetic Disk media etc, not included in the drawing for clarity.

Figure 5:
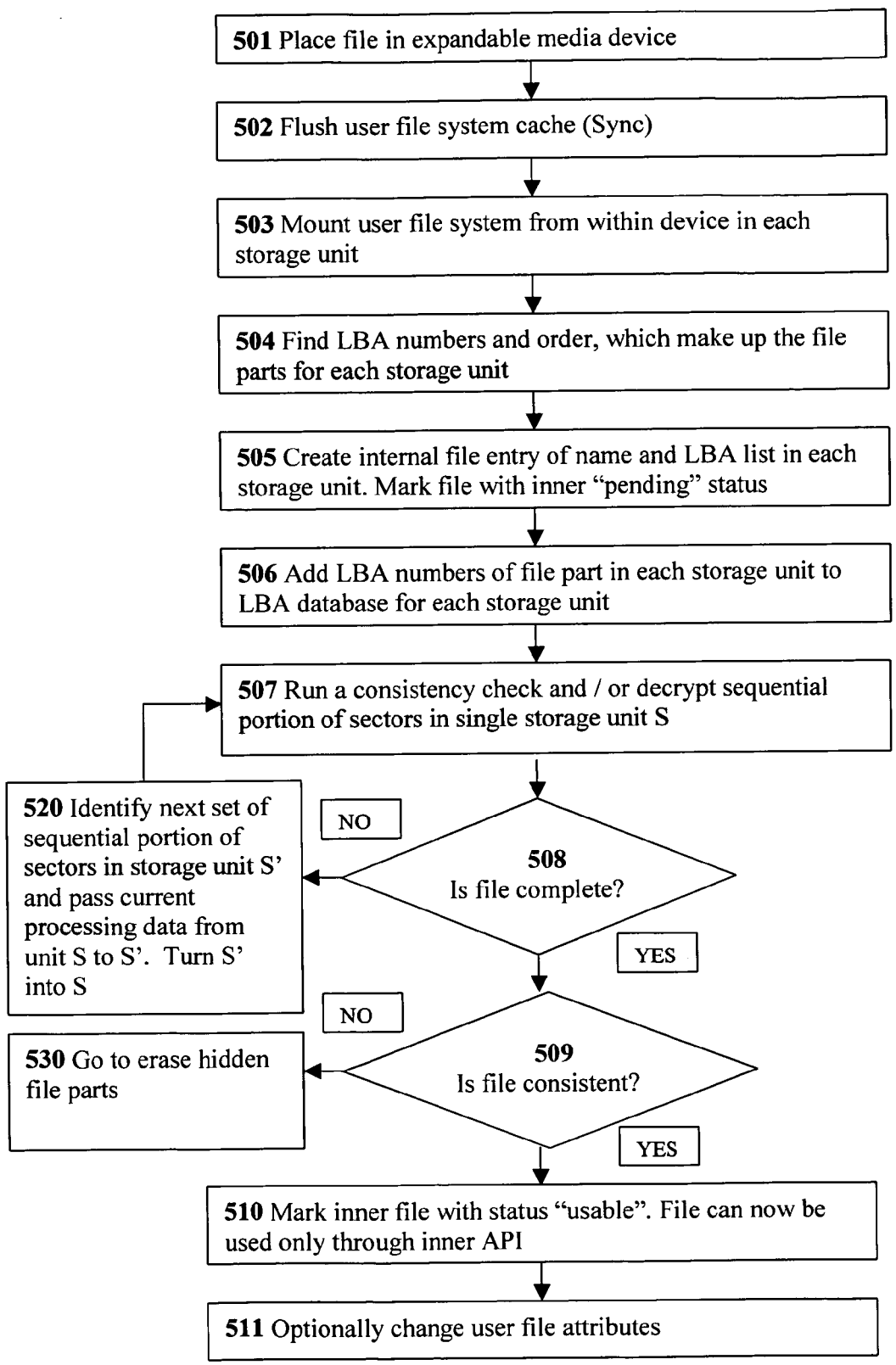
FIG. 5 is a schematic flowchart for dynamically securing a file on an expandable media device, in accordance with an embodiment of the present invention.

With the addition of a decryptor/validation module 419 and keys 417, a file or a portion of a file may be transferred securely to the media device for use only through internal processing. FIG. 5 presents a manner in which a secure file is transferred securely into media device storage units.

In some embodiments the internal media table 416 may exist on the physical user media 402.

The internal processing unit 418 may use internal file table and other internal data in conjunction with data of physical user media 402 available through API 2 in order to process and output data. The processed output data may be placed into a file in the physical user media 402 readable through API 1 408 using the internal file table 416, for digital appliance 120 use. Other manners of passing processed data to the digital appliance 120 may be made, such as through I/O module 420.

In some embodiments expandable storage unit includes a dynamic security policy enforcer and an internal independent user file table.

Reference is now made to FIG. 5, which is a schematic flowchart for dynamically securing a file on an expandable media device, in accordance with an embodiment of the present invention.

In FIG. 5 an encrypted file is delivered to expandable media device. Expandable media device then makes the file inaccessible to digital appliance and decrypts the file internally for internal use.

In this embodiment a secure file is encrypted with a key and each storage unit has the key to open the secure file. This scenario may be implemented by sending the key to each storage unit in a secure manner.

In step 501 the secure encrypted file is placed in the physical user media of the expandable media device, for example by copying the file onto the expandable media device or transferring it from the Internet onto the expandable media device. The file may be physically stored within several storage units, each including some portions of the file.

In step 502 the expandable digital media cache and buffers are being flushed. This is done for example in Linux by the utility Sync. In Windows this is done for example by a utility Sync from www.sysinternals.com.

In step 503 the file system of the user is mounted from within the expandable media device within each storage unit. This mounting may include the recent file now that the digital appliance has flushed its buffers. File table may exist in expandable unit 100 or within storage units or both, depending on implementation.

In step 504 the LBA indexes making up the file parts within each storage unit are collected from the file system table. This may be done using the expandable media device single file system table, which may be stored in allocation table 108, or from storage units file system table if applicable. For example in a FAT32 file system of the expandable media device, the first cluster is included in the file's directory entry. The next cluster entry is included in the FAT entry for the first cluster. The next cluster is included in the FAT entry of the previous cluster and so forth. The LBA order of indexes is translated from the cluster numbers above to the actual clusters within each storage unit through sector table 106. In some embodiments digital appliance may transfer LBA addresses to expandable media Device. In some embodiments expandable unit 100 transfers LBA addresses to each storage unit.

In step 505 an internal file entry including file part name and LBA list within that storage unit is created in the internal file table 416 of each storage unit including a file portion of file to be protected. The LBA list may contain more than a single file part. The file entry is created in a location unreachable to the digital appliance. The information stored may include the file name, the LBA list and order of where the file data on the physical user media 402 is kept. The file status in the internal file table 316 is marked as "pending" and cannot be used at this time.

In step 506 LBA numbers for each file part in each storage unit is added to LBA database of storage unit, making these LBA numbers belonging to encrypted file readable only internally to storage unit. These LBA numbers become unreadable through API 1 408 and readable through API 2 410.

In step 507 consistency check and/or decryption is run in sequence for the current file part where it resides in storage unit S. The first file part of the file is used when step 507 occurs for the first time.

In step 508 we check if the file part just executed in step 507 is the last file part of the file so that the file is complete. If yes, step 509 follows. If no then there is another file part and step 520 follows.

In step 520 next file part is identified as the next set of sequential portion of sectors in a storage unit S'. Current processing data such as consistency and decryption variables are passed from storage unit S to storage unit S' in order to allow to continue validation and/or decryption.S' then turns into S and step 507 follows for validating and/or decrypting this next file part.

In step 509 A check is made to see if the file is consistent through checking validation information of the file. Verification process may include a digital signature such as SHA1. If file is consistent step 510 follows. If file is inconsistent step 530 follows.

In step 530 go to erase hidden file parts. This step occurs when file is determined to be inconsistent and the file parts are erased by first wiping all LBA data belonging to file in each file part, then removing file entries in user file table and lastly removing LBA numbers of file from LBA database. In some embodiments the erasing process may not occur at this time.

In step 510 inner file is marked with status "usable". This is because the file is consistent and can be usable safely within expandable media device. File can now be used through API 2 410.

In step 511 attributes of user file or attributes of entire file are optionally changed within the user accessible file table. This may be performed so that the user may not attempt to use or modify the secure file. File attributes may be changes to "System", "Hidden", Read-Only" and so forth so that the file may not be accidentally removed by the user and that a de-fragmentation operation may not attempt to change the physical location of this file. Marking file sectors (or clusters) as "bad" so that the digital appliance may not use the sectors is also a possibility.

Usage of protected file may be accomplished within each storage unit, by using API 2 410 from within storage unit to access protected file part. In addition, other information may be communicated between storage units in various manners. Processed information may be made available to digital appliance through API 1 408 or other means.

This series of steps displays how a file may change its security policy dynamically within an expandable media device. A file may be verified and decrypted while kept inaccessible to digital appliance throughout verification and decryption process occurring within each storage unit containing one or more file part of file being secured. Consequently verified and decrypted file may be used within storage units according to specified security rules for the secured file.

This dynamic property of file policy is made possible through the LBA database 406 and the internal file table 416. The internal file table 416 gathers independent meta-data file information for the dynamic security policy enforcer 404. This information allows changing LBA permission to the correct LBA indexes making up the file through the use of the LBA database 406. Even if a user attempts to change the file allocation table of the expandable media device or storage unit file system header, the file will remain secured due to the fact that the file meta-data is managed through the internal file table 416. The LBA database protects the correct LBA indexes as listed in the internal file table 416. The data may be safely used once file is internally verified, such as with a digital signature.

Processing of file portions within each storage unit may be accomplished by passing data between storage units when processing is made between file portions within different storage units.

It may be appreciated by those skilled in the art of the present invention that the following advantages exist in this invention, over the existing mechanisms:

(a) With the present invention, it may be possible to expand the storage capacity of a media device by adding other storage units to the media device.

(b) The present invention may allow expanding the storage capacity of a media device with other storage units by emulating a single device with an expanded storage capacity. This may allow storing large data files of size up to the new expanded storage capacity, as well as adding additional files to the same device volume.

(c) The present invention may allow expanding the storage capacity of a media device while keeping the existing user data on the media device.

(d) Media device allows placing files with different access policies on expanded storage space.

(e) The present invention allows using files with access policy protection on expanded storage devices.

(f) The present invention may allow expanding the storage capacity of a media device while keeping the existing protected data on the media device.

CONCLUSION, RAMIFICATIONS AND SCOPE

Accordingly, the reader will see that the closure of this invention provides a method to expand the storage capacity of a media device with other media device storage units. The expanded device may emulate a single large capacity media device of the size of the accumulated capacity of the storage units. The ability to expand media device capacity allows continuing using a single media device rather than replacing device due to insufficient size.

Furthermore with the expandable media device, there are additional advantages in that:

(a) Adding more storage to an existing expandable media device may allow keeping user data files valid while increasing total device volume capacity.

(b) Large files may be stored on the expandable media device. The size of a file may exceed any single media device unit capacity used by the expandable media device.

(c) More files may be stored on expandable media device in the same device volume, following device expansion.

(d) The capacity of digital appliances that make use of a media device may be expanded. This may allow continuing using a digital appliance by expanding its capacity rather than by replacing it.

(e) The expandable media device may support standard operating system file formats not requiring a special or proprietary file system.

(g) The expandable media device may allow using files with a protected policy in addition to user files on the same volume.

(h) Adding more storage to an existing expandable media device may allow keeping data files with a protected policy valid while increasing total device volume capacity, for protected and unprotected file usage.

Although the description above contains many specifications, these should not be constructed as limiting the scope of the invention but as merely providing illustrations of some exemplary embodiments of this invention.

For example, the expandable unit 100 may include user data space. Storage units may be added in serial to expandable unit 100, or in other ways. Each storage unit may be similar to an expandable unit 100. Each storage unit may be used independently on its own. Each storage unit may be different to the expandable unit 100. The specified names, expandable unit and storage unit have been made for clarification purposes and not to be limiting; Any type of operating system format may be used other than FAT32, such as NTFS, UNIX file system etc; The expandable unit may be a part of a digital appliance. This may be used to expand storage capacity for a digital appliance. Digital appliance may be any device that makes use of digital storage; Allocation table 108 and sector table 106 are helpful for explanation purposes. Some embodiments may not include these as they may be deduced from storage units that are up to date; Storage units may be made to be used on their own or in conjunction with other storage units; Files which are split between storage units may be named as a file parts on storage units; Files may be protected from digital appliance in other manners than described; Adding or removing of storage units from expandable media device may occur at a different time to power up of device; In order to preserve files following storage unit changes, rewrites to file allocation table may be necessary to make adjustments. In some embodiments virtual memory storage drives and RAM-drives, simulative media devices are used.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A management system for monitoring capacity change of a data storage device and for adjusting file system capacity and file system structure and contents of a file system located on said data storage device when capacity of said data storage device changes said file system includes a file allocation table which must immediately be followed by a file data region for correct operation of said file system said file data region stores data belonging to said data files the system comprising:

a. a logic unit capable of altering parameters and structure of existing said file system containing data files in a manner that adjusts said file system storage capacity leaving said file system and said data files consistent said file system structure is adjusted by said logic unit in a manner that said file allocation table size changes keeping said file allocation table appear to be followed immediately by said file data region, b. a monitoring unit for indicating when change in storage capacity of said data storage device occurs, whereby said monitoring unit indicates a change in storage capacity said logic unit changes parameters and structure of existing said file system according to said indication of storage capacity change said logic unit may expand or shrink said file allocation table according to change of storage capacity of said data storage device independently by said data storage device keeping said file system consistent for file system operation and keeping said file system capacity updated following said change in storage capacity.

2. The management system of claim 1 wherein said logic unit of said data storage device is capable of adjusting capacity of said file system keeping all existing data files on said file system valid when storage capacity of said data storage device is increased.

3. The management system of claim 1 wherein said logic unit of said data storage device is capable of adjusting capacity of said file system keeping existing data files on said file system valid for said data files not missing any data by changing capacity of said data storage device.

4. The management system of claim 1 wherein said data storage device is coupled to a digital appliance said digital appliance is running an operating system capable of storing and accessing data using said file system stored on said data storage device said management system having a capability of continuing to mode of normal operation following change of storage capacity of said device whereby said monitoring unit indicates a change in storage capacity of said data storage device said logic unit alters parameters and structure of said file system according to current storage capacity of said data storage device said file system capacity is adjusted according to current storage capacity in a manner that keeps existing said data files of said data storage device consistent said management system indicates continuation to normal operation of said data storage device when said data storage device is ready for use by said digital appliance running said operating system.

5. The management system of claim 4 wherein said data storage device is formatted for use of said operating system of said digital appliance said file system format requires said file allocation table to immediately follow said data region whereby said logic unit of said data storage device is capable of adjusting said file system in a manner that keeps said file system format consistent for use of said operating system following said capacity change of said data storage device.

6. The management system of claim 4 wherein said data storage device is formatted for use of said operating system of said digital appliance said data storage device includes said data files stored on said file system said file system format requires said file allocation table to immediately follow said data region whereby following said capacity change of said data storage device said logic unit of said data storage device is capable of adjusting said file system and keeping existing said data files on said file system valid for said data files not missing any data following said capacity change said file system format is kept consistent for use of said operating system of said digital appliance.

7. The management system of claim 1 wherein said file allocation table is stored in a manner such that said file allocation table may expand without overwriting some of said file data region thereby file allocation table may expand or shrink according to change of storage capacity of said data storage device independently by said data storage device keeping said file system structure consistent for file system operation following a change in storage capacity.

8. The management system of claim 1, wherein said management system further comprises an access restriction table indicating access restriction policies for data stored on said data storage device said data storage device is capable of independently changing said access restriction table whereby said access restriction table is adjusted according to updated location of access restricted data following capacity change of said data storage device.

9. A method for adjusting file system capacity of a file system containing data files stored on a data storage device when changing data storage capacity of said data storage device the method comprising:

a. changing data storage capacity available to said data storage device, b. changing parameters of said file system according to said change of data storage capacity to indicate change of data storage capacity of said file system said file system includes a file allocation table required to immediately be followed by a file data region for correct operation of said file system said file data region stores data belonging to said data files, c. changing size of said file allocation table according to said change of data storage capacity without overwriting file data stored in said file data region of said file system, d. keeping said file data region appear to immediately follow said file allocation table thereby keeping said file system and said data files consistent following said change in data storage capacity.

10. A method according to claim 9 wherein said data storage device is coupled to a digital appliance said digital appliance is running an operating system capable of storing and accessing data using said file system stored on said data storage device said file data region appears to follow immediately by said file allocation table to said operating system of said digital appliance following said change of data storage capacity whereby said operating system reporting updated storage capacity size and current existing data of said data storage device following said change of data storage capacity.

11. A file storage device for storing files for subsequent access, the device comprising:

an external interface for accessing data files contained within a file system stored on said device said file system includes a file allocation table having a dependency constraint requiring said file allocation table to immediately be followed by a file data region for correct operation of said file system said file data region stores data belonging to said data files, an internal capacity checking logic capable of detecting change in total available storage capacity for said file system, an internal logic capable of changing parameters of said file system and capable of changing size of said file allocation table of said file system in a consistent manner according to said detected change in storage capacity without overwriting file data stored in said file data region of said file system keeping said dependency constraint having said file allocation table appear to be followed immediately by said file data region for data access made through said external interface thereby keeping said data files consistent and accessible through said external interface following said detected change in storage capacity.

* * * * *